(12) United States Patent
Hironaka

(10) Patent No.: US 6,368,393 B1
(45) Date of Patent: Apr. 9, 2002

(54) FAN FILTER UNIT FOR CLEANROOM

(75) Inventor: Takanori Hironaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/615,722

(22) Filed: Jul. 13, 2000

(30) Foreign Application Priority Data

Jul. 14, 1999 (JP) ............................... 11-200154

(51) Int. Cl.[7] ..................... B01D 50/00; B01D 53/02
(52) U.S. Cl. ....................... 96/111; 96/134; 96/142; 96/417; 55/318; 55/338; 55/385.2; 55/473; 95/12; 95/90; 454/187
(58) Field of Search .................. 96/108, 111, 134, 96/142, 417; 55/318, 338, 339, 340, 385.2, 467, 473; 95/3, 8, 11, 12, 90, 274, 286, 287; 454/187

(56) References Cited

U.S. PATENT DOCUMENTS

| | | | |
|---|---|---|---|
| 3,066,462 A | * 12/1962 | Yap et al. | 95/287 |
| 3,804,942 A | * 4/1974 | Kato et al. | 96/142 |
| 4,285,702 A | * 8/1981 | Michel et al. | 96/111 |
| 5,174,797 A | * 12/1992 | Yow, Sr. et al. | 95/20 |
| 5,290,344 A | * 3/1994 | Onodera | 96/134 |
| 5,722,738 A | * 6/1998 | Muraoka | 55/385.2 |
| 5,827,339 A | * 10/1998 | Nagafune et al. | 55/385.2 |
| 5,833,726 A | * 11/1998 | Kinkead et al. | 55/385.2 |
| 5,858,041 A | * 1/1999 | Luetkemeyer | 55/385.2 |
| 5,876,489 A | * 3/1999 | Kunisaki et al. | 55/385.2 |
| 5,972,060 A | * 10/1999 | O'Halloran et al. | 55/385.2 |
| 6,033,301 A | * 3/2000 | Suwa | 55/385.2 |
| 6,123,617 A | * 9/2000 | Johnson | 96/108 |

FOREIGN PATENT DOCUMENTS

JP        09287791 A      11/1997

* cited by examiner

Primary Examiner—David A. Simmons
Assistant Examiner—Jason M. Greene
(74) Attorney, Agent, or Firm—Young & Thompson

(57) ABSTRACT

A fan filter unit for use in cleanrooms is provided, which decreases efficiently the concentration of chemical substance existing in the atmosphere while the expansion of the air circulating space and the electric power consumption increase of the fan-driving motor are suppressed. The unit comprises an enclosure having an air inlet through which an outside air is introduced into the enclosure and an air outlet through which a cleaned air is emitted or discharged from the enclosure; a chemical filter mounted in the enclosure to remove chemical substance existing in the outside air; a dust filter mounted in the enclosure to remove dust existing in the outside air; a fan mounted in the enclosure to introduce the outside air into the enclosure through the air inlet and to emit the cleaned air to outside of the enclosure; and a bypassing path for returning part of the outside air that has penetrated the chemical filter to an upstream side of the fan without penetrating the dust filter. A damper may be additionally provided in the bypassing path for adjusting the amount of the outside air returned to the upstream side of the fan. Preferably, the damper is adjusted in such a way that the velocity of the air at the air outlet of the enclosure is set at a specific value.

6 Claims, 6 Drawing Sheets

FAN FILTER UNIT FOR CLEANROOM

BACKGROUND OF THE INVENTION

1. Field of the Invention

The present invention relates to a fan filter unit to be installed in cleanrooms of factories for manufacturing semiconductor devices, liquid-crystal panels, and films and more particularly, to a fan filter unit comprising a ventilation fan and dust and chemical filters incorporated into an enclosure, which removes efficiently dust and chemical substance existing in the atmosphere of a cleanroom by the chemical and dust filters and which enables energy saving of the fan and reduction of the air circulating space.

2. Description of the Related Art

To maintain the cleanliness of air in the cleanroom at a specific level, typically, cleanroom systems have been used. For example, whole laminar flow type cleanroom systems have been used for this purpose, which comprise fan filter units of this sort arranged on the whole ceiling surface of the cleanroom. FIG. 1 schematically shows the configuration of an example of the prior-art cleanroom systems of this sort.

The prior-art cleanroom system 100 shown in FIG. 1 comprises a cleanroom 140, a ceiling chamber 147 formed over the cleanroom 140, fan filter units 142 arranged in a matrix array on the whole ceiling surface 140a of the cleanroom 140, an underfloor region 144 defined by floor panels 143 arranged on the floor of the cleanroom 140, a cooling coil 145 for air-temperature control mounted in the region 144, and an air circulation path 146 that connects the region 144 with the chamber 147. Each of the fan filter units 142 includes a ventilation fan 148 and a dust filter 141. Each of the floor panels 143 has a punched or perforated structure that allows the air to penetrate.

With the prior-art cleanroom system 100 shown in FIG. 1, the air existing in the ceiling chamber 147 is introduced into the inside of the fan filter units 142 by their fans 148. The air thus introduced is passed through the filters 141 to be cleaned by the same. The air thus cleaned or filtered is emitted or blown to the inside of the cleanroom 140. At this time, the cleaned air emitted from the units 142 form a vertical laminar flow of air that heads for the floor panel 143 from the ceiling surface 140a of the cleanroom 140. The cleaned air thus emitted into the cleanroom 140 flows vertically into the underfloor region 144 through the floor panels 143 and then, returns to the ceiling chamber 147 through the cooling coil 145 and the circulation path 146. Thereafter, the air thus returned to the chamber 147 is introduced into the cleanroom 140 again.

Through the above-described processes, the clean air is repeatedly circulated in the cleanroom system 100. The cooling coil 145 serves to decrease the thermal load of the circulating air and therefore, the clean air with a fixed temperature is always supplied to the cleanroom 140. Also, since the vertical laminar flow of the air is formed in the cleanroom 140, the inside of the cleanroom 140 can be maintained at a specific high cleanliness level.

The Japanese Non-Examined Patent Publication No. 9-287791 published in November 1997 discloses a cleanroom system having approximately the same configuration as that shown in FIG. 1.

Although the above-described cleanroom system 100 makes the cleanroom 140 highly clean, there is an anxiety that defects occur in the product due to contamination induced by chemical substance existing in the atmosphere in the leading-edge manufacturing processes for highly miniaturized products such as ultralarge-scale integrated circuits (ULSIs). To cope with the anxiety, fan filter units having chemical filters have been developed and used, an example of which is shown in FIG. 2.

The prior-art fan filter unit 250 shown in FIG. 2 comprises an enclosure or casing 252 having a first cylindrical part 252a and a second cylindrical part 252b that are coaxially connected together. The first part 252a is smaller in size than the second part 252b. The bottom end of the first part 252a is connected to the top end of the second part 252b. The inner space of the first part 252a communicates with the inner space of the second part 252b.

An air inlet 252c is formed at the top end of the first part 252a. A ventilation fan 253 is mounted in the first part 252a. The fan 253 is driven by a motor (not shown) provided in the part 252a. An air outlet 252d is formed at the bottom end of the second part 252b. A dust filter 254 for removing dust or particles and a chemical filter 251 for removing chemical substance are mounted to be vertically apart from each other in the second part 252b. The dust filter 254 is fixed to the bottom end of the second part 252b so as to close the air outlet 252d. The chemical filter 251 is fixed to the inner wall of the second part 252b over the dust filter 254 at a specific distance. A partition plate 255 having holes 255a in its peripheral area is fixed to the inner wall of the second part 252b over the chemical filter 251 at a specific distance. The plate 255 divides the inner space of the enclosure 252 into upper and lower ones. The upper and lower spaces thus divided are connected to each other through the holes 255a of the plate 255.

With the prior-art fan filter unit 250 shown in FIG. 2, the outside air 261 existing in the outside of the unit 250 is introduced into the enclosure 252 through the air inlet 252c, forming the air 262. The air 262 thus introduced into the enclosure 252 flows to reach the chemical filter 251 through the holes 255a of the partition plate 255. The chemical filter 251 removes chemical substances contained in the air 262, forming the chemical-removed air 263. The air 263 thus filtered further flows to the dust filter 254 and penetrates the same. The dust filter 254 removes dust or particles contained in the air 263. As a result, the purified air 264 is emitted from the outlet 252d of the enclosure 252 to the outside of the unit 250.

The prior-art unit 250 shown in FIG. 2 can be used as the fan filter unit 142 of the prior-art cleanroom system 100 shown in FIG. 1. In this case, the concentration of chemical substance existing in the atmosphere of the cleanroom 140 can be lowered, because the unit 250 includes the chemical filter 251. To further decrease the concentration of chemical substance in the cleanroom 140, there is the need to increase the flow rate of the purified air 264 emitted from the unit 250, thereby raising the flow rate of the air 262 that penetrates the chemical filter 251.

However, if the flow rate of the purified air 264 emitted from the unit 250 is increased, the overall amount of the circulating air within the cleanroom system 140 increases. This raises a problem that the air circulating space (i.e., the air circulation path 146 and the ceiling chamber 147) needs to be expanded.

Also, to allow the increased circulating air to penetrate the path 146 and the air-cooling coil 145, the fan 253 needs to provide higher static pressure. Thus, there is a problem that electric power consumption of the motor for driving the fan 253 is raised.

SUMMARY OF THE INVENTION

Accordingly, an object of the present invention is to provide a fan filter unit that decreases efficiently the concentration of chemical substance existing in the atmosphere while the expansion of the air circulating space and the electric power consumption increase of the fan-driving motor are suppressed.

The above object together with others not specifically mentioned will become clear to those skilled in the art from the following description.

A fan filter unit according to the present invention comprises:

an enclosure having an air inlet through which an outside air is introduced into the enclosure and an air outlet through which a cleaned air is emitted or discharged from the enclosure;

a chemical filter mounted in the enclosure to remove chemical substance existing in the outside air;

a dust filter mounted in the enclosure to remove dust existing in the outside air;

a fan mounted in the enclosure to introduce the outside air into the enclosure through the air inlet and to emit the cleaned air to outside of the enclosure; and a bypassing path for returning part of the outside air that has penetrated the chemical filter to an upstream side of the fan without penetrating the dust filter.

With the fan filter unit according to the present invention, the bypassing path is provided for returning part of the outside air that has penetrated the chemical filter to an upstream side of the fan without penetrating the dust filter (i.e., without passing through the air circulating space and the air cooling coil). Thus, the necessary pressure loss occurring in the circulation of the outside air through the dust filter and other necessary members such as floor panels, a cooling coil, and an air circulating space can be reduced. As a result, the electric power consumption increase of the fan-driving motor can be suppressed.

Moreover, since the amount of the air penetrating the chemical filter is increased without increasing the overall amount of the air that is circulated in the cleanroom, the concentration of chemical substance existing in the atmosphere of the cleanroom can be decreased while the expansion of the air circulating space can be suppressed.

In a preferred embodiment of the unit according to the invention, a damper is further provided in the bypassing path for adjusting the amount of the outside air returned to the upstream side of the fan. In this case, it is preferred that the dumper is adjusted in such a way that the velocity of the air at the air outlet of the enclosure is set at a specific value.

In another preferred embodiment of the unit according to the invention, a sensor or detector is further provided for sensing or detecting the concentration of chemical substance existing in the air, in which the damper is controlled on the basis of the result of sensing or detection. In this case, it is preferred that the sensor or detector is used to sense or detect the concentration of chemical substance existing in the air in a cleanroom itself or in an air circulating space of a cleanroom.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
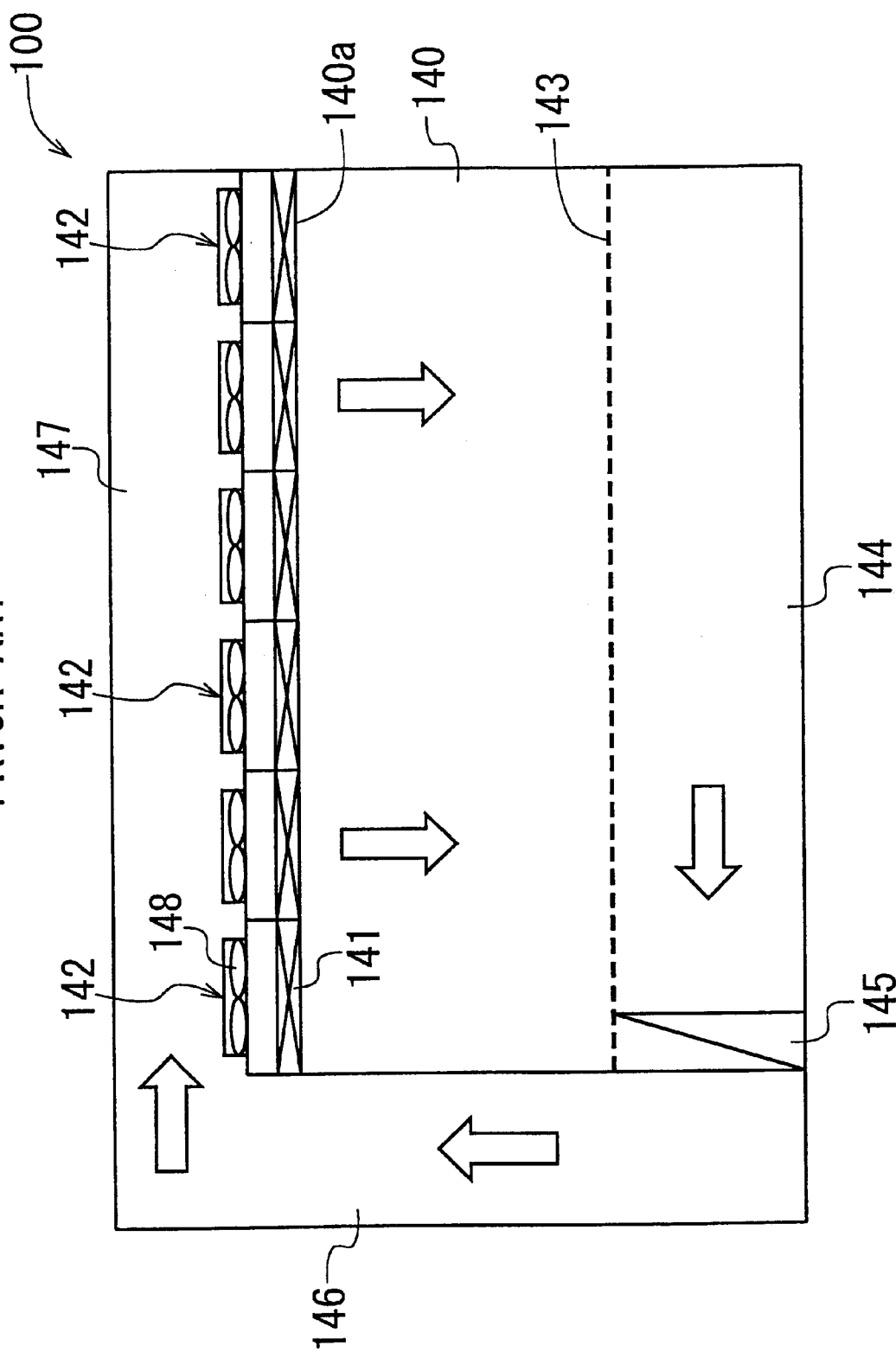
FIG. 1 is a schematic cross-sectional view showing the configuration of a prior-art cleanroom system equipped with fan filter units on its ceiling.
Figure 2:
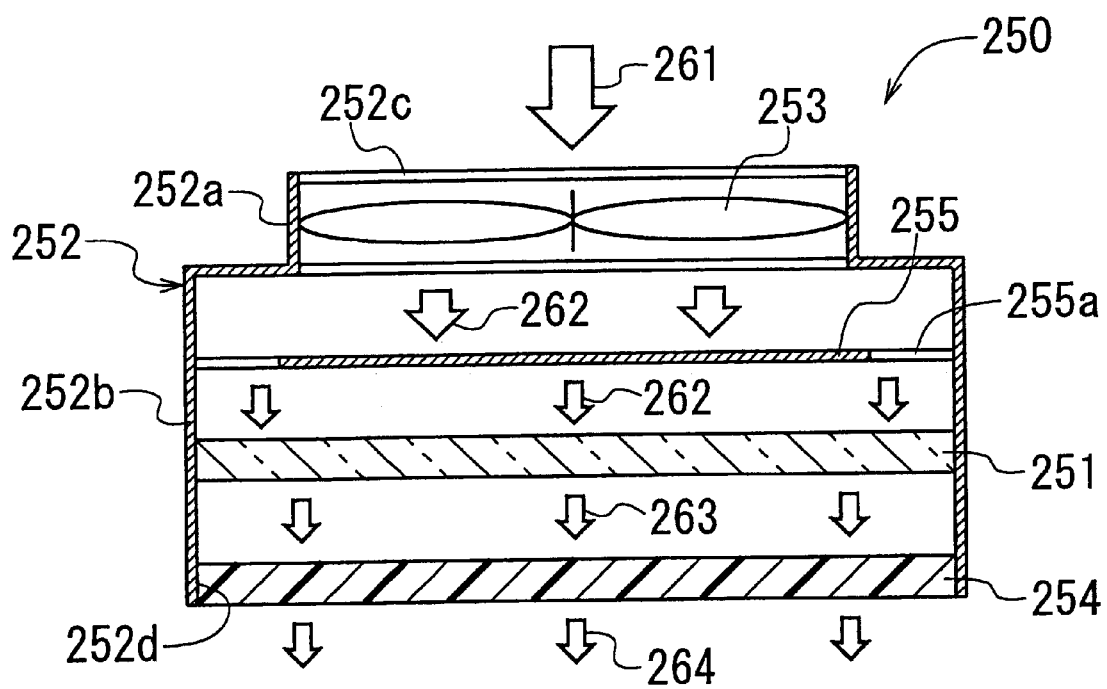
FIG. 2 is a schematic cross-sectional view showing the structure of a prior-art fan filter unit into which a chemical filter and a dust filter are incorporated.

Preferred embodiments of the present invention will be described in detail below while referring to the drawings attached.

First Embodiment

Figure 3:
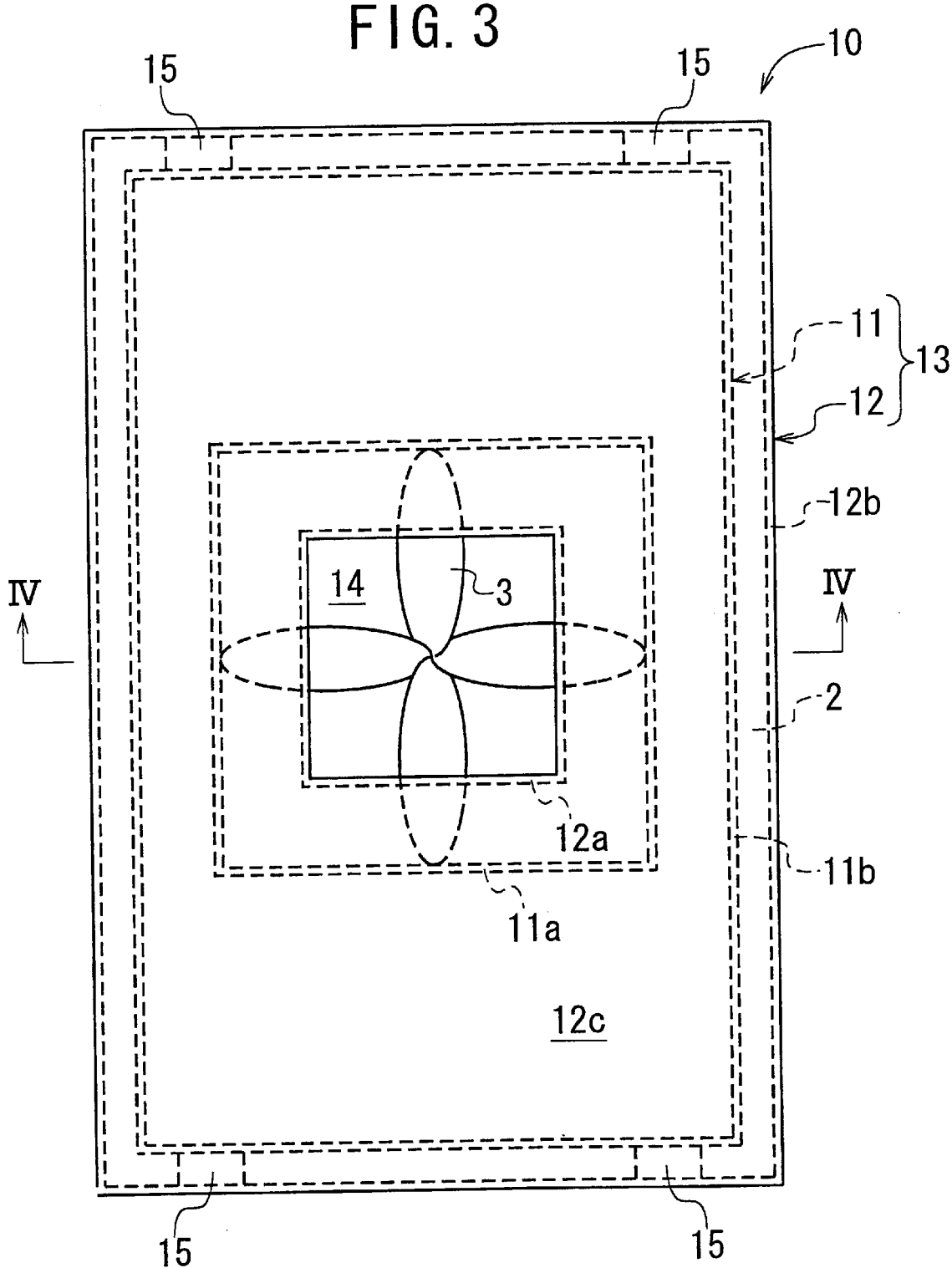
FIG. 3 is a schematic plan view showing the configuration of a fan filter unit according to a first embodiment of the present invention.
Figure 4:
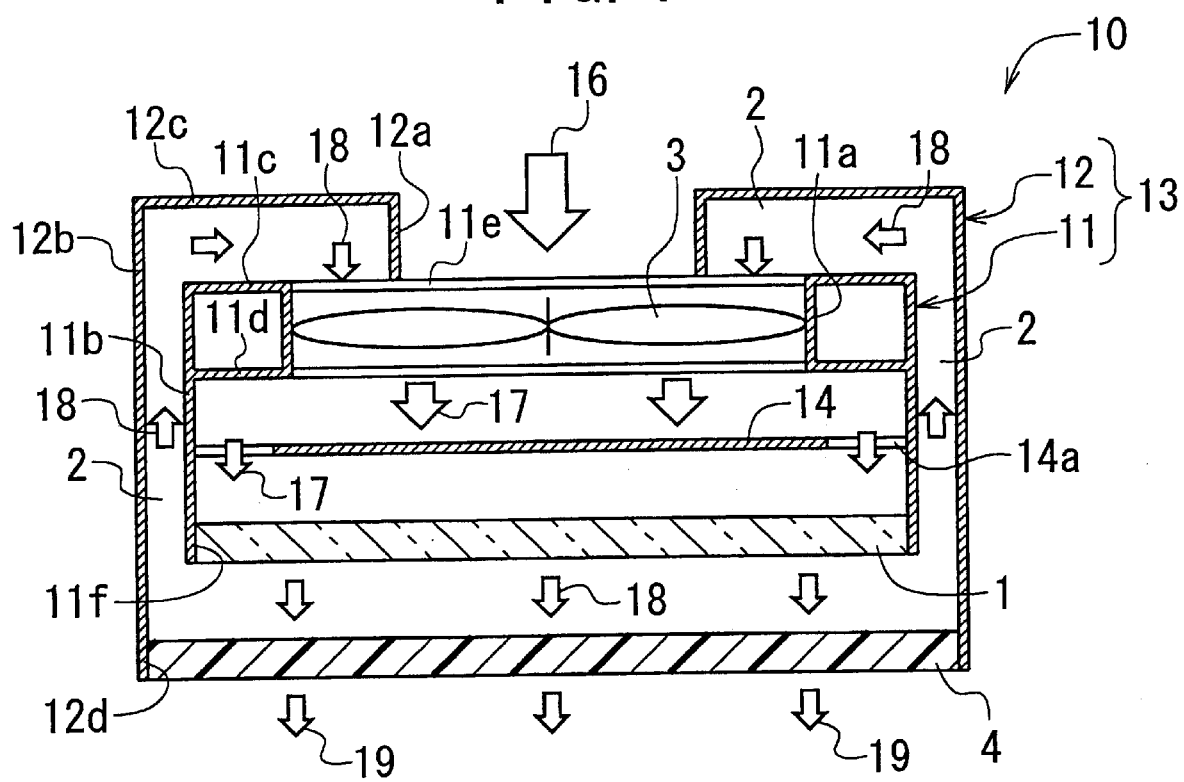
FIG. 4 is a schematic cross-sectional view along the line IV—IV in FIG. 3.

A fan filter unit according to a first embodiment of the invention is shown in FIGS. 3 and 4.

As shown in FIGS. 3 and 4, a fan filter unit 10 according to the first embodiment is comprised of an enclosure or casing 13 with an approximately rectangular plan shape. The enclosure 13 is formed by a cylindrical inner member 11 and a cylindrical outer member 12.

The inner cylindrical member 11 of the enclosure 13 includes a first cylindrical part 11a and a second cylindrical part 11b, both of which are extending vertically. The first and second parts 11a and 11b are fixed together to be coaxial with respect to a common vertical axis by way of plate-shaped third and fourth parts 11c and 11d. The third and fourth parts 11c and 11d extend laterally. The first part 11a is entirely located inside the second part 11b. The third part 11c is located over the fourth part 11d at a specific distance. The top end of the first part 11a is connected to the top end of the second part 11b by way of the third part 11c. The bottom end of the first part 11a is connected to the bottom end of the second part 11b by way of the fourth part 11d.

The outer cylindrical member 12 of the enclosure 13 includes a first cylindrical part 12a and a second cylindrical part 12b, both of which are extending vertically. The first and second parts 12a and 12b are fixed together to be coaxial with respect to the common vertical axis for the inner member 11 by way of a plate-shaped third part 12c. The third part 12c extends laterally. The first part 12a is entirely located inside the second part 12b. The top end of the first part 12a is connected to the top end of the second part 12b by way of the third part 12c. The bottom end of the first part 12a is not connected to the bottom end of the second part 12b.

As clearly shown in FIG. 3, the second part 11a of the inner member 11 and the second part 12b of the outer member 12 are connected to each other with four supporting members 15 extending along the lateral, longitudinal axis of the enclosure 13. Thus, the inner member 11 is fixed to the outer member 12 at a specific gap.

An air-returning path 2 is formed between the outer surfaces of the second and third parts 11b and 11c of the inner member 11 and the inner surfaces of the first, second, and third parts 12a, 12b, and 12c of the outer member 12. The path 2 extends along the whole outer surface of the inner member 11.

A rectangular air inlet 11e is formed at the top end of the first part 11a of the inner member 11. The inlet 11e is defined by the top edge of the first part 11a. The first part 12a of the outer member 12 is entirely overlapped with the inlet 11e. The third part 12c of the outer member 12 is partially overlapped with the inlet 11e. Thus, only inner part of the inlet 11e is exposed to the outside of the enclosure 13 and the remaining part of the inlet 11e is exposed to the air path 2.

A ventilation fan 3 is mounted horizontally in the first part 11a of the inner member 11, as shown in FIGS. 3 and 4. The fan 3 is driven by a motor (not shown) mounted in the first part 11a. The inner part of the fan 3 is exposed to the outside of the unit 10 and the outer part thereof is exposed to the air path 2.

A chemical filter 1 is located in the second part 11b of the inner member 11. The filter 1 is fixed to the bottom end of the second part 11b so as to close the bottom opening 11f of the part 11b.

The chemical filter 1 may be made of a material such as activated carbon, activated carbon mixed with a specific chemical agent, or ion-exchange fibers, which removes alkaline gases, acid gases, or organic gases.

A partition plate 14 is fixed to the inner wall of the second part 11b of the inner member 11. The plate 14 is located just over the chemical filter 1 at a specific distance. The plate 14, which has penetrating holes 14a in its peripheral area, divides the inner space of the member 11 into upper and lower ones. The upper and lower spaces thus divided are connected together by way of the holes 14a.

A rectangular air outlet 12d is formed at the bottom end of the second part 12b of the outer member 12. The outlet 11d is defined by the bottom edge of the second part 12b. The outlet 11d is larger than the bottom opening 11f of the second part 11b of the inner member 11 and the chemical filter 1.

A dust filter 4 is located in the second part 12b of the outer member 12. The filter 4 is fixed to the bottom end of the second part 12b so as to close the outlet 12d. The filter 4 is apart vertically from the chemical filter 3.

As the dust filter 4, for example, a HEPA (High Efficiency Particulate Air) filter or an ULPA (Ultra Low Penetration Air) filter may be used.

Next, the operation of the fan filter unit 10 having the above-described configuration is explained below.

First, the outside air 16 existing outside the filter fan unit 10 is introduced into the inner member 11 of the enclosure 13 by way of the inner, exposed part of the air inlet 11e due to the action of the fan 3, forming the inside air 17. The inside air 17 thus formed in the member 11 is sent to the underlying chemical filter 1 due to the action of the fan 3 by way of the holes 14a of the partition plate 14 and then, it penetrates the filter 1. Thus, specific chemical substance is removed from the air 17 by the filter 1, forming the chemically filtered air 18.

Part of the chemically filtered air 18 from which specific chemical substance has been removed flows to the dust filter 4 to penetrate the same toward the outside of the unit 10. Dust existing in the air 18 is removed by the dust filter 4, forming the cleaned or purified air 19 outside the unit 10. The air 19 is emitted from the air outlet 12d of the unit 10.

On the other hand, the remainder of the chemically filtered air 18 is returned to the air inlet 11e by way of the air-returning path 2 formed between the inner and outer members 11 and 12. In other words, the path 2 serves as a bypassing path for returning the remaining part of the air 18 to the inlet 11e without penetrating the dust filter 4 and emitting to the outside. The air 18 thus returned to the inlet 11e is introduced again into the first part 11a of the inner member 11. The chemically filtered air 18 thus returned and the outside air 16 thus newly introduced are mixed together to form the inside air 17, which passes through the chemical filter 1.

Thus, the chemically filtered air 18 that has passed through the chemical filter 1 is repeatedly circulated in the fan filter unit 10. As a result, the chemical substance contained in the outside air 17 can be removed efficiently without increasing the flow rate of the cleaned or purified air 19 emitted from the unit 10.

Next, a cleanroom system equipped with the fan filter units 10 is explained below with reference to FIG. 5.

Figure 5:
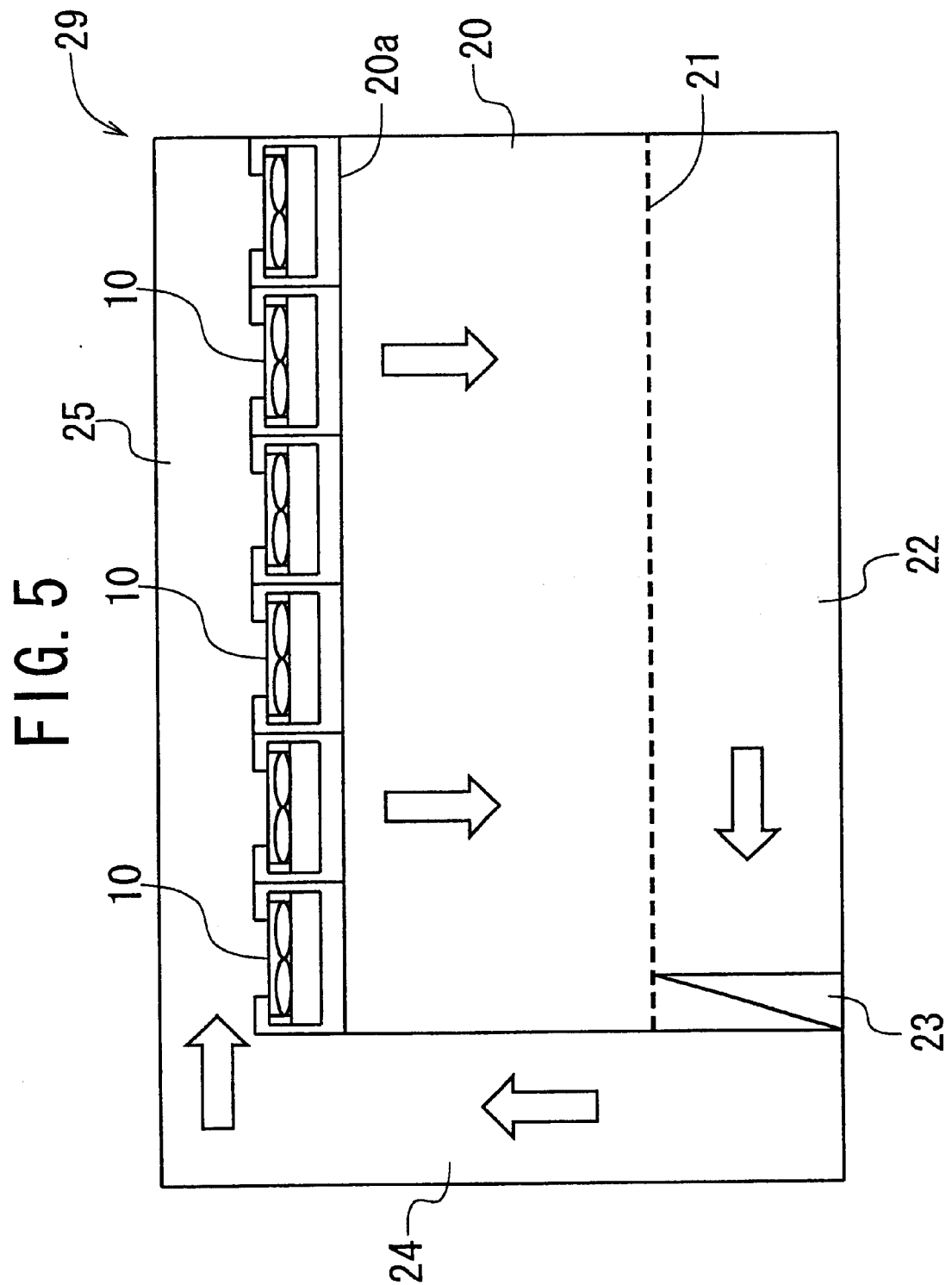
FIG. 5 is a schematic cross-sectional view showing the configuration of a cleanroom system equipped with the fan filter units according to the first embodiment of the invention on its ceiling.

A cleanroom system 29 shown in FIG. 5 comprises a cleanroom 20, a ceiling chamber 25 formed over the cleanroom 20, the fan filter units 10 arranged on the whole ceiling surface 20a of the cleanroom 20 in a matrix array, an underfloor region 22 defined by floor panels 21 arranged on the floor of the cleanroom 20, a cooling coil 23 for air-temperature control mounted in the region 22, and an air-circulation path 24 that connects the underfloor region 22 with the ceiling chamber 25. Each of the fan filter units 10 has the configuration according to the first embodiment as described above. The floor panel 21 has a punched or perforated structure that allows the air to penetrate.

With the cleanroom system 29 shown in FIG. 5, the air existing in the ceiling chamber 25 is introduced into the inside of the fan filter units 10 due to the sucking action of the fans 3. The air thus introduced is cleaned or purified by penetrating the chemical filters 1 and the dust filters 4 of the units 10. The air thus cleaned or purified is then emitted to the inside of the cleanroom 20. At this time, the cleaned air emitted from the units 10 form a vertical laminar flow of air that heads for the floor panel 21 from the ceiling surface 20a of the cleanroom 20. The cleaned air in the cleanroom 20 flows into the underfloor region 22 through the floor panels 21 and then, returns to the ceiling chamber 25 by way of the cooling coil 23 and the circulation path 24. Thereafter, the air existing in the chamber 25 is introduced into the cleanroom 20 again.

Through the above-described processes, the clean air is circulated in the cleanroom system 29 as shown by arrows in FIG. 5. The cooling coil 23 serves to decrease the thermal load of the circulating air and therefore, the clean air with a fixed temperature is supplied to the cleanroom 20.

The fan filter units 10 remove efficiently desired chemical substance from the air and thus, the removing or filtering efficiency of desired chemical substance is raised. This means that the flow rate increase of the air emitted from the units 10 is not necessary. Accordingly, the air-circulation path 24 and the ceiling chamber 25 (i.e., the air circulating space) need not to be expanded for raising the efficiency of removing the chemical substance.

Subsequently, to compare the cleanroom system 29 including the fan filter units 10 according to the first embodiment of the invention with the prior-art cleanroom system 100 using the prior-art fan filter units 250, the inventor calculated the pressure drop of air.

In this calculation, 50% of the chemically filtered air 18 was set to be returned to the inlet side of the unit 10 without passing through the dust filter 4. The pressure losses L1, L2, and L3 of the chemical filter 1, the path 2, and the dust filter 4 for the air were set at 3 mmAq, 1 mmAq, and 10 mmAq, respectively. The pressure losses L4, L5, and L6 of the floor panels 21, the cooling coil 23, and the returning path 24 for the air were set at 2 mmAq, 3 mmAq, and 2 mmAq, respectively.

When the prior-art fan filter units 50 were used, the total pressure loss L of the air of the cleanroom system 100 is given as the sum of the pressure losses of the chemical filter 251, the dust filter 254, the floor panels 143, the cooling coil 145, and the path 146. Thus, the following equation (1) is established.

$$L=L1+L3+L4+L5+L6 \qquad (1)$$

As a result, total pressure loss L of the cleanroom system 100 with the units 50 is equal to 20 mmAq (i.e., L=20 mmAq).

On the other hand, when the fan filter units 10 according to the first embodiment of the invention were used, 50% of the air 18 is returned to the inlet side of the unit 10 without passing through the dust filter 4. Accordingly, the total pressure loss L of the air of the cleanroom system 100 is given as the average of the sum of the pressure losses of the chemical filter 1 and the path 2 and the sum of the pressure losses of the chemical filter 1, the dust filter 4, the floor panels 21, the cooling coil 23, and the path 24. Thus, the following equation (2) is established.

$$L = \frac{(L1+L2)+(L1+L3+L4+L5+L6)}{2} \qquad (2)$$

As a result, total pressure loss L of the cleanroom system 100 with the units 10 is equal to 12 mmAq (i.e., L=12 mmAq), which is (3/5) times the value with the prior-art units 50.

As explained above, with the cleanroom system 29 using the fan filter units 10 according to the first embodiment, the total pressure loss L is lowered and as a result, the electric power consumption of the motors driving the fans 3 can be decreased.

Also, as already explained above, the unit 10 has the bypass path 12 between the inner and outer members 11 and 12 of the enclosure 13 while the dust filter 4 is located in the outer member 12. Part of the air 18 that has passed through the chemical filter 1 is returned to the inside of the inner member 11 by way of the path 12. Accordingly, the function of the unit 10 to remove the specific chemical substance without increasing the flow rate of the air to be emitted from the unit 10.

Moreover, with the cleanroom 29 using the units 10 according to the first embodiment, the function of the cleanroom 29 to remove the specific chemical substance can be enhanced without expanding the circulating space of the air. Since the pressure loss of the air in the system 29 is decreased, the electric power consumption of the motors driving the fans 3 is lowered.

Second Embodiment

Figure 6:
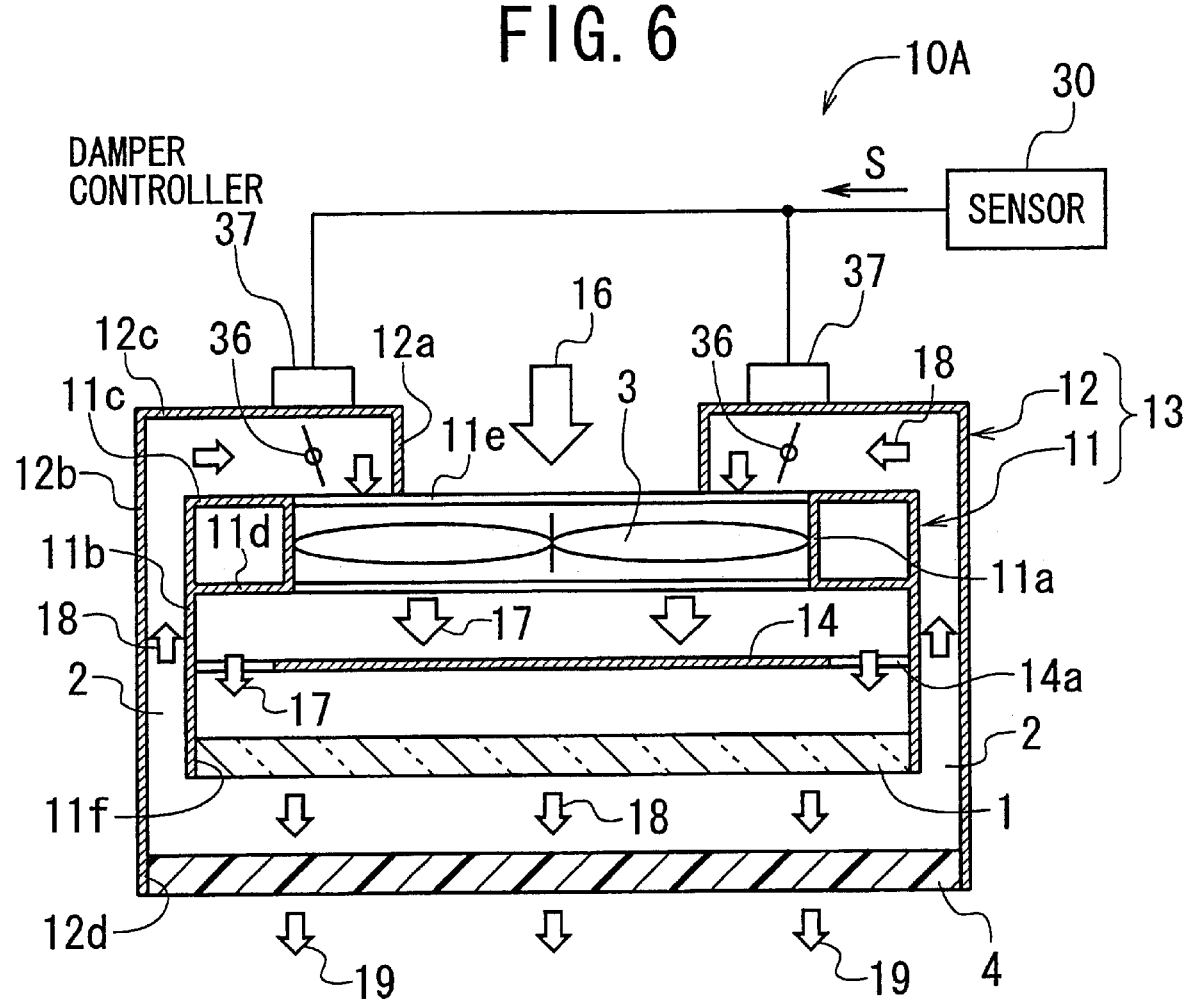
FIG. 6 is a schematic cross-sectional view showing the configuration of a fan filter unit according to a second embodiment of the invention, which is along the line IV—IV in FIG. 3.

FIG. 6 shows a fan filter unit 10A according to a second embodiment of the invention, which has the same configuration as that of the fan filter unit 10 according to the first embodiment, except that dampers 36 are provided in the returning or bypassing path 2. Thus, the explanation about the same configuration as the unit 10 is omitted here for the sake of simplification by attaching the same reference symbols as used the first embodiment to the same or corresponding elements in FIG. 6.

The unit 10A comprises the dampers 36 located in the path 2 near the air inlet 11e, and damper controllers 37 located onto the outer member 12 of the enclosure 13 for controlling the respective dampers 36.

Each of the dampers 36 has two fins. The flow rate of the air 18 passing through the path 2 is controlled or adjusted by changing the angel of the fins with respect to the flowing direction of the air 18.

Each of the damper controller 37 is electrically connected to a sensor or detector 30 for sensing or detecting the desired chemical substance. The sensor 30 is located in the cleanroom 20 or the air path 24. The sensor 30 senses the specific chemical substance existing in the air flowing in the cleanroom 20 or path 24 and then, sends a signal S to the damper controllers 37 according to the sensing result (i.e., the concentration of the chemical substance). In response to the signal S, the controllers 37 adjusted the angle of the fins of the dampers 36.

For example, when the concentration of the specific chemical substance is higher than a predetermined reference value, the controllers 37 controls the corresponding dampers 36 to widen their paths for the air 18. Thus, the flow rate of the air 18 to be returned to the upstream side (i.e., the air inlet 11e) is increased and thus, the removing or filtering efficiency of the chemical substance is improved. As a result, the concentration of the chemical substance existing in the cleanroom 20 or the circulating path 24 is kept at the specific level or lower.

As the sensor 30, any ion chromatograph may be used for sensing the ammonia concentration and any gas chromatograph mass spectrometer may be used for sensing the organic substance concentration.

As explained above, with the fan filter unit 10A according to the second embodiment of FIG. 6, the dampers 36 are additionally provided in the bypassing path 2 to control the flow rate of the air 18 on the basis of the concentration of the chemical substance sensed by the sensor 30, thereby controlling the flow rate of the air 18 in the path 2. Thus, the removing or eliminating efficiency of the chemical substance or substances can be further raised compared with the unit 10 according to the first embodiment. This facilitates keeping the chemical substance or substances at or lower than the specific value.

VARIATIONS

In the above-described fan filter units 10 and 10A according to the first and second embodiments, the bypassing path 2 is formed to extend over the whole outer surface of the second part 11b of the inner member 11. However, the path 2 may be located only on the opposing outer surfaces of the second part 11b of the inner member 11, in other words, the cross-section of the path 2 may be determined so that the air flows through the path 2 at a desired flow rate.

In the unit 10A according to the second embodiment, the dumpers 36 are controlled on the basis of the concentration of the chemical substance detected by the sensor 30. However, any means for measuring the air flow velocity may be provided in the vicinity of the outlet 12d in order to measure the flow velocity of the air 19 emitted from the outlet 12d. In this case, the dampers 36 are controlled in such a way that the flow velocity of the air 19 emitted from the outlet 12d is kept at a desired value or values.

Needless to say, the invention is not limited to the first and second embodiments. For example, the invention is applicable to a fan module unit comprising a plurality of fan filter units and a common ventilating fan, which are incorporated into an enclosure. In this case, the same advantage as those in the first or second embodiment are given.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A fan filter unit comprising;
an enclosure having an air inlet through which an outside air is introduced into said enclosure and an air outlet through which a cleaned air is emitted or discharged from said enclosure;
a chemical filter mounted in said enclosure to remove chemical substances existing in the outside air;
a dust filter mounted in said enclosure to remove dust existing in the outside air;
a fan mounted in said enclosure to introduce the outside air into said enclosure through said air inlet and to emit the cleaned air to outside of said enclosure; and
a bypassing path for returning part of the outside air that has penetrated said chemical filter to an upstream side of said fan without penetrating said dust filter.

2. The unit according to claim 1, further comprising a damper provided in said bypassing path for adjusting an amount of said outside air returned to the upstream side of said fan.

3. The unit according to claim 2, wherein said damper is adjusted in such a way that a velocity of the air at said air outlet of said enclosure is set at a specific value.

4. The unit according to claim 2, further comprising a sensor for sensing a concentration of chemical substances existing in the air, in which said damper is controlled on a basis of sensing result.

5. The unit according to claim 4, wherein said sensor is used to sense the concentration of chemical substances existing in the air in a cleanroom itself.

6. The unit according to claim 4, wherein said sensor is used to sense the concentration of chemical substances existing in an air circulating space of a clean room.

* * * * *